US005794494A

United States Patent [19]

Long, Jr.

[11] Patent Number: 5,794,494

[45] Date of Patent: Aug. 18, 1998

[54] WIRE CUTTING AND STRIPPING MECHANISM

[75] Inventor: Alden Owen Long, Jr., Carlisle, Pa.

[73] Assignee: The Whitaker Corporation, Wilmington, Del.

[21] Appl. No.: 804,785

[22] Filed: Feb. 22, 1997

[51] Int. Cl.[6] .................... H02G 1/12

[52] U.S. Cl. .................... 81/9.51

[58] Field of Search .................... 81/9.51; 83/947, 83/950, 591, 675

[56] References Cited

U.S. PATENT DOCUMENTS

| | | | |
|---|---|---|---|
| 1,802,462 | 4/1931 | Dumroese | 81/9.51 |
| 3,027,925 | 4/1962 | Gronberg | 83/591 |
| 3,831,482 | 8/1974 | Eichler et al. | 83/675 |
| 5,165,319 | 11/1992 | Snyder et al. | 83/675 |
| 5,199,328 | 4/1993 | Hoffa | 81/9.51 |
| 5,253,555 | 10/1993 | Hoffa | 81/9.51 |
| 5,469,763 | 11/1995 | Hoffa | 81/9.51 |
| 5,473,811 | 12/1995 | Atzet | 81/9.51 |

*Primary Examiner*—James G. Smith
*Assistant Examiner*—Lee Wilson
*Attorney, Agent, or Firm*—Marshall E. Rosenberg

[57] ABSTRACT

A machine (10) is disclosed for processing an insulated wire (12), to sever the wire into a feed end and an eject end, and to remove a selected portion (132) of insulation from each of the ends. The machine (10) includes a wire cutting and stripping unit (22) including left and right cutting and stripping blade holder assemblies (42, 44). Each holder assembly includes three sets of cutting and stripping blades (58, 59, 60, 61, 62, 63) for severing and stripping three different wire gage sizes. Additionally, a mechanism (60, 62, 126) is provided for rotating the left and right holder assemblies (42, 44) so that selected blades converge toward each other to effect the severing of the wire (12). After severing the wire, the left and right holder assemblies (42, 44) are further moved in the converging directions so that appropriate blades move into insulation cutting engagement with the feed side end and the eject side end. As the two ends are withdrawn away from the cutting blades, the cut insulation slugs (132) are stripped off and collected by scrap collection tubes (124, 126).

18 Claims, 7 Drawing Sheets

WIRE CUTTING AND STRIPPING MECHANISM

The present invention relates to wire processing machines and more particularly to an improved mechanism for cutting a wire to length and stripping the insulation from the cut ends.

BACKGROUND OF THE INVENTION

Machines that utilize electrical wire in the manufacture of a product typically draw lengths of wire from an endless source, such as a reel, and feed the drawn wire into mechanisms that operate on the wire in some way to produce the product. Sometimes the wire is cut to a specific length and it becomes the product, other times the wire is used to interconnect electrical components in a product. The former, for example, is made by a machine that is typically called a "lead maker" in the industry These machines draw wire from an endless source, measure its length precisely, then cut it to a desired length. The ends may or may not be terminated to electrical terminals, or the ends may simply be prepared for termination. A wire cutting and stripping unit is provided having a set of cutting blades for cutting the wire and a separate set of stripping blades for stripping a desired length of insulation from the ends of the wire, as may be required. Usually, the wire cutting blades and the stripping blades are fixed in a common tool holder that is movable toward and away from the wire path. The cutting blades extend further outwardly so that as the tool holder is advanced toward the wire, the cutting blades engage and cut the wire followed immediately by the stripping blades engaging the wire and severing the insulation. The wire is then pulled axially away from the cutting and stripping unit so that the cut slug of insulation is stripped away from the wire. This arrangement requires that the stripping blades be spaced from the cutting blades a predetermined distance that corresponds to the desired length of the strip. When a wire requiring a different length of strip is processed, the spacing between the stripping blades and the cutting blades must be adjusted, usually by inserting or removing spacers. This requires that the machine by taken out of service while this is done. There is usually insufficient room between the cutting blades and the stripping blades to provide a scrap collection system, so the stripped slug is allowed to simply fall downwardly by gravity. This sometimes causes large amounts of scrap to accumulate in the machine that is difficult to remove and may cause a malfunction. To overcome the undesirable requirement of taking the machine out of service to change the length of strip, a mechanism has been used to advance the tool holder toward the wire in two distinct steps. In the first step the wire is severed and the advancement of the tool holder is momentarily stopped. The wire is then repositioned axially with respect to the stripping blades by the wire feed system. The mechanism then resumes moving the tool holder so that the stripping blades engage and sever the insulation at the desired place and, as above, the wire is withdrawn axially to strip away the slug of insulation. This has the advantage that the strip length is controllable through automation so that wires having different strip length requirements can be processed by the lead maker in succession without stopping the machine for adjustment. While this structure is advantageous, an important drawback is that three pairs of cutting blades must be used, one pair for severing the wire and two other pairs positioned on opposite sides of the severing blades for cutting the insulation when stripping. This requires suitable mounting structures for the six blades that accurately position them and move them into engagement with the wire, resulting in a relatively expensive and complex mechanism. Further, when the machine is reconfigured to process wire of a different gage the two pairs of stripping blades must be replaced with blades of a size corresponding to the different gage. Additionally, the problem of scrap accumulation is not addressed.

What is needed is a simple and inexpensive wire cutting and stripping unit having only two pairs of cutting blades for each gage of wire that both sever the wire and then engage the two severed ends and cut the insulation preparatory to stripping. Additionally, the unit should include additional pairs of cutting blades that are automatically positionable for accommodating anticipated different wire gage sizes. When the cut insulation is stripped from the cut ends of the wire, a scrap collection device should be adjacent the stripping blades to capture the stripped slug.

SUMMARY OF THE INVENTION

A machine and method are disclosed for processing an insulated wire, to sever the wire into a feed end and an eject end, and to remove a selected portion of insulation from at least one of the feed end and the eject end. The machine includes a wire cutting and stripping unit including a first left blade having a first cutting edge, a second left blade having a second cutting edge, a first right blade having a third cutting edge, and a second right blade having a fourth cutting edge. The first and second left blades are attached to a left holder and the first and second right blades are attached to a right holder. A wire feed unit is provided for moving the wire along a wire path between the first and third cutting edges in a first direction and in a second opposite direction. Additionally, a drive unit is provided for moving the left and right holders in third and fourth opposite directions, respectively, so that the first left and first right blades converge toward each other and the first and third cutting edges sever the wire. After severing, the left and right holders are further moved in the third and fourth directions so that the first right and second left blades converge and the second and third cutting edges move into insulation cutting engagement with the feed side end, and the first left and second right blades converge and the first and fourth cutting edges move into insulation cutting engagement with the eject side end.

DESCRIPTION OF THE PREFERRED EMBODIMENT

Figure 1:
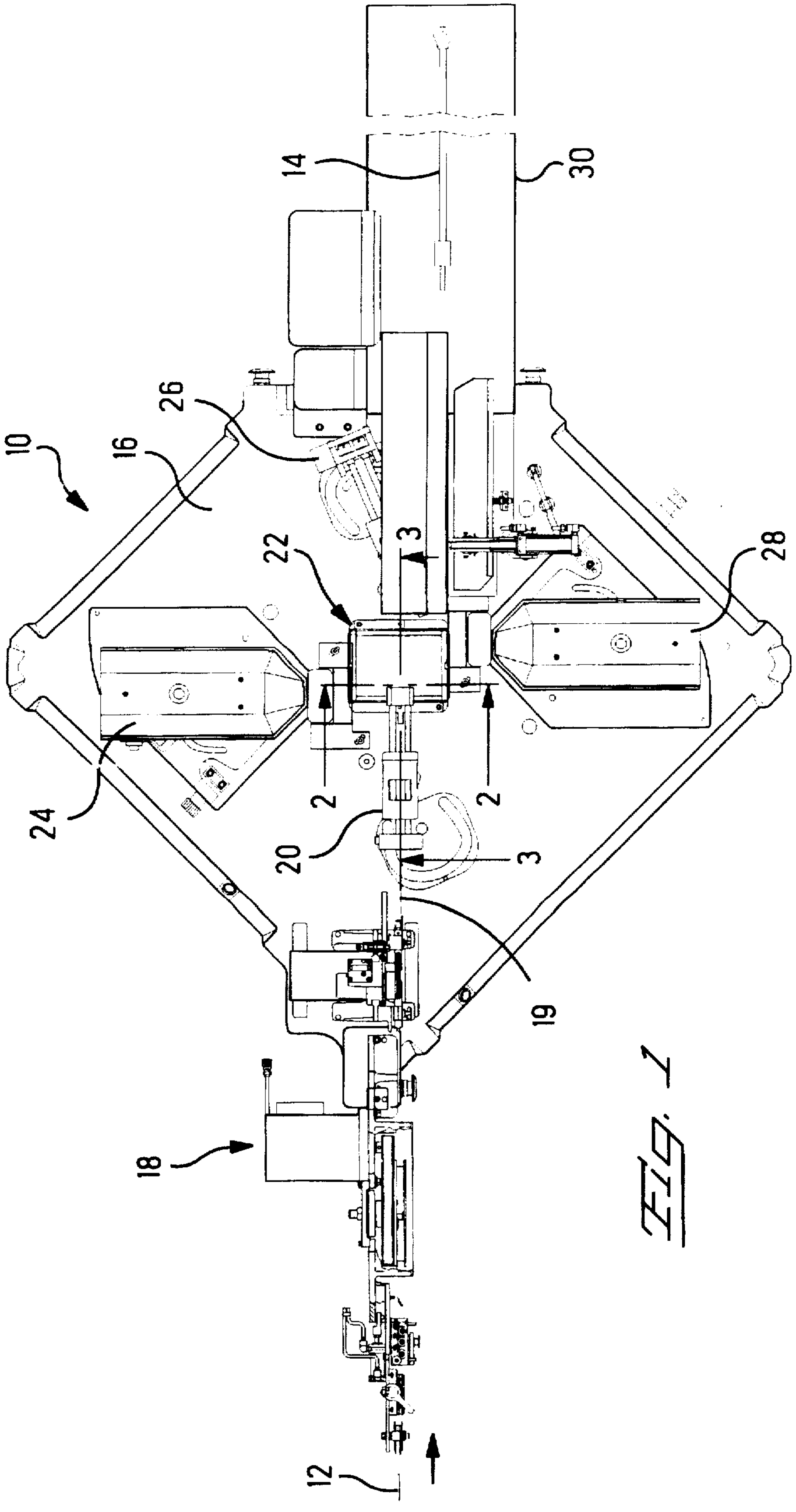
FIG. 1 is a top view of a wire processing machine having a wire cutting and stripping mechanism incorporating the teachings of the present invention.

There is shown in FIG. 1 a wire processing machine 10 for receiving a continuous length of wire 12 in the making of electrical leads 14. The machine 10 includes a frame 16 and a wire inlet assembly 18 attached to the frame which straightens the wire and feeds it into the processing portion of the machine along a wire path 19. A feed side wire transfer unit 20 is arranged to position the wire with respect to a wire cutting and stripping unit 22 for cutting the lead 14 to length and for stripping the insulation from the cut ends of the wire 12 and lead 14, as desired. Additionally, the feed side transfer unit 20 will position the cut end of the wire 12 in terminating tooling held by a feed side terminating unit 24 for attachment of a terminal, if required. The partially completed lead 14 is then received by an eject side transfer unit 26 which positions the cut end of the lead in terminating tooling held by an eject side terminating unit 28 for attachment of a terminal, if required. The completed lead is then ejected into a stacking tray 30, as shown in FIG. 1.

Figure 2:
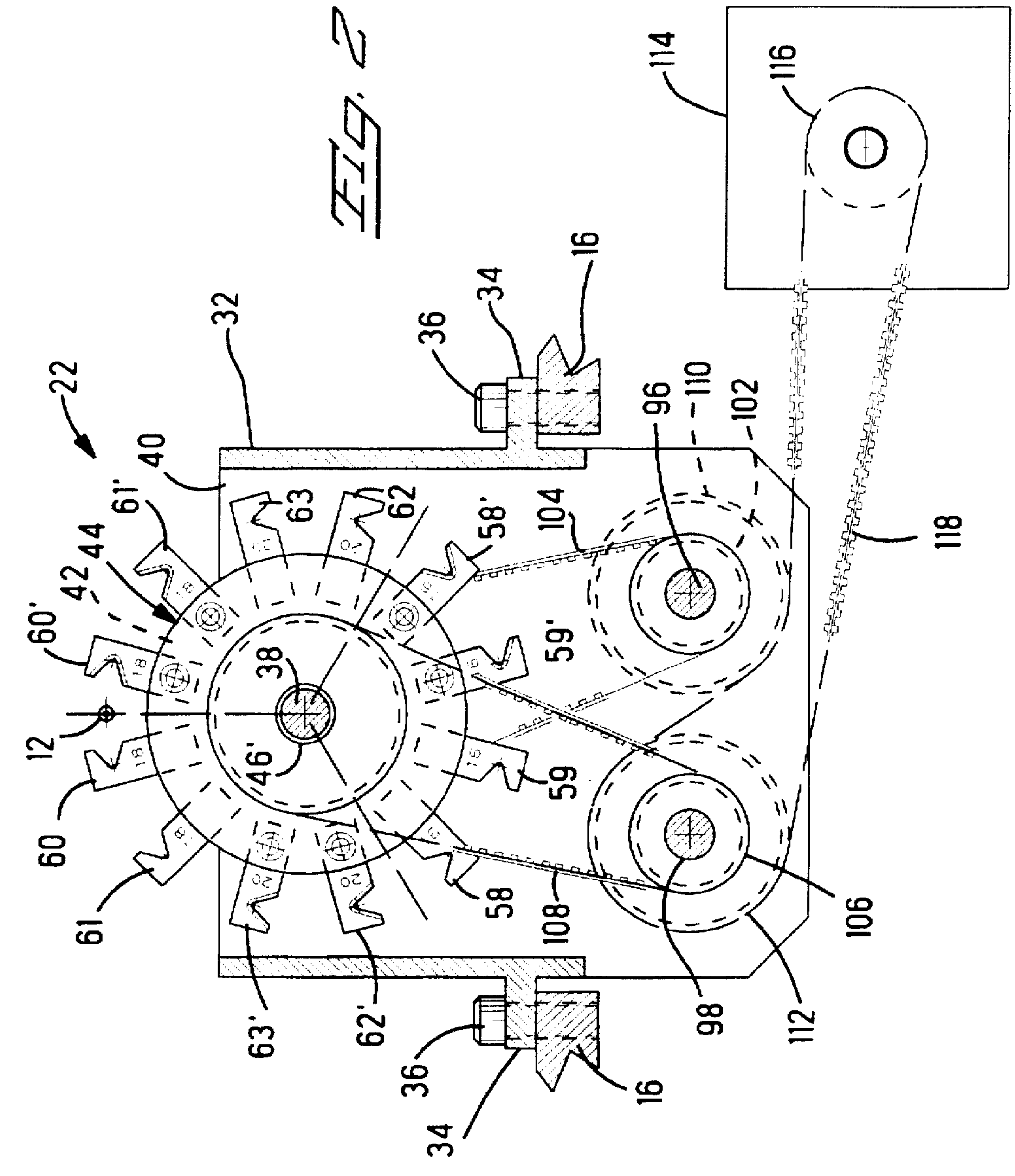
FIG. 2 is a cross-sectional view taken along the lines 2—2 in FIG. 1, showing the blade actuating mechanism in a fully open position.
Figure 3:
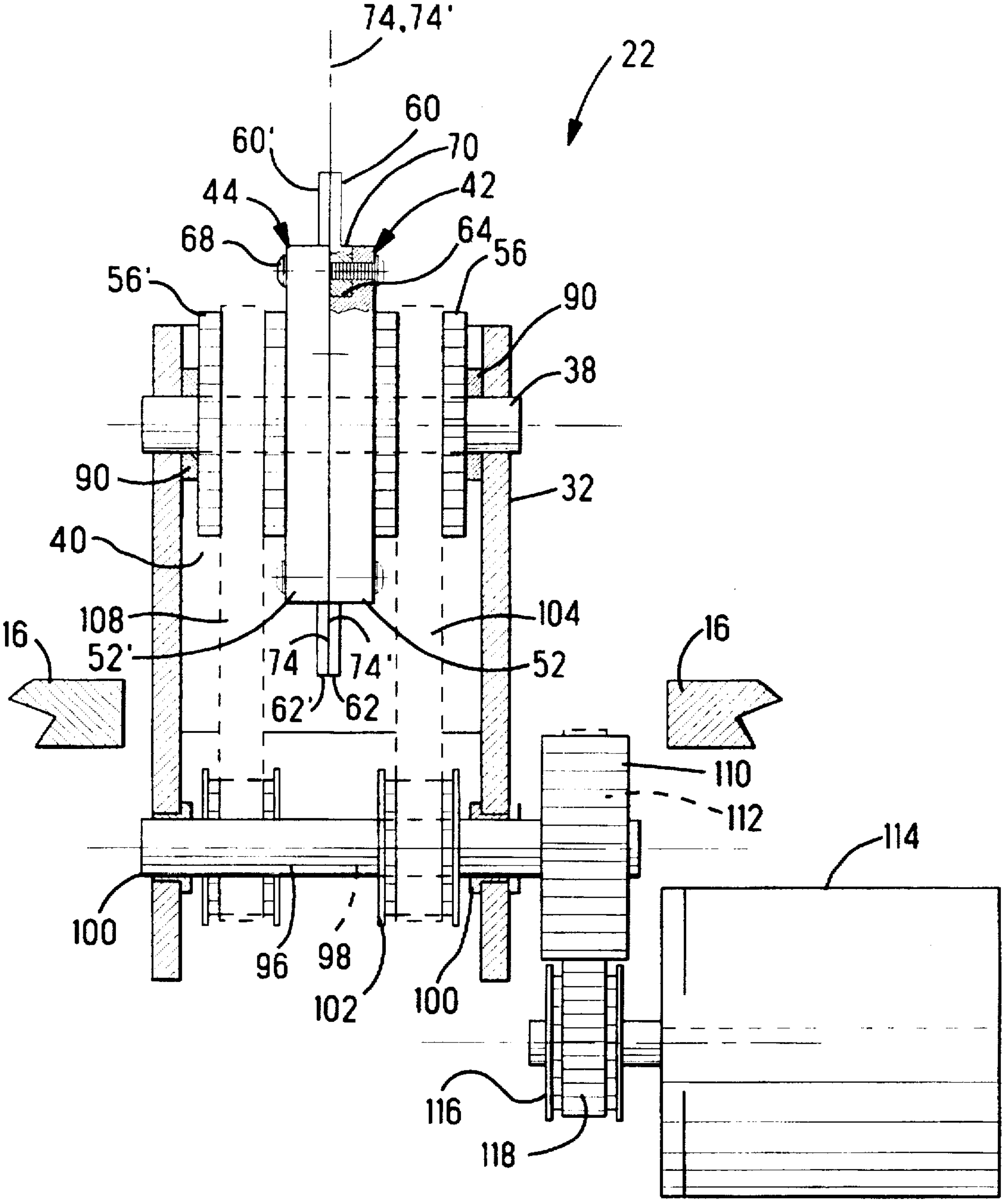
FIG. 3 is a cross-sectional view taken along the lines 3—3 in FIG. 1.
Figure 5:
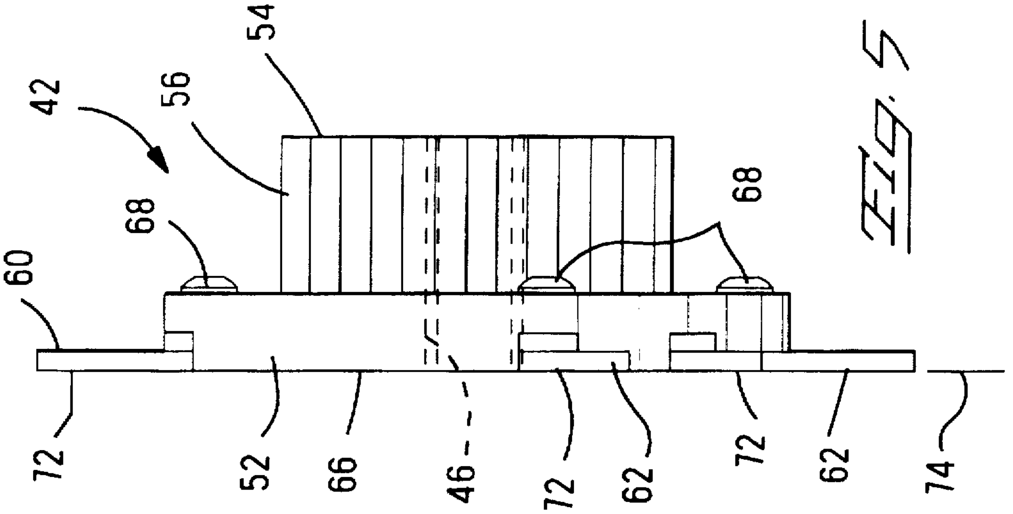
FIGS. 4 and 5 are front and side views, respectively, of the right cutting blade holder shown in FIG. 3.

The wire cutting and stripping unit 22, as shown in FIG. 2, includes a housing 32 having a pair of mounting flanges 34 on opposite sides which are secured to the frame 16 by means of screws 36 extending through clearance holes in the flanges and into threaded holes in the frame 16. A stationary shaft 38 extends between two opposite walls of the housing 32, spanning the interior 40, as best seen in FIG. 3. Right and left cutting blade holder assemblies 42 and 44, respectively, are journaled for rotation on the stationary shaft 38 by means of bearings 46 and 46' arranged in a bore in each holder assembly.

Figure 4:
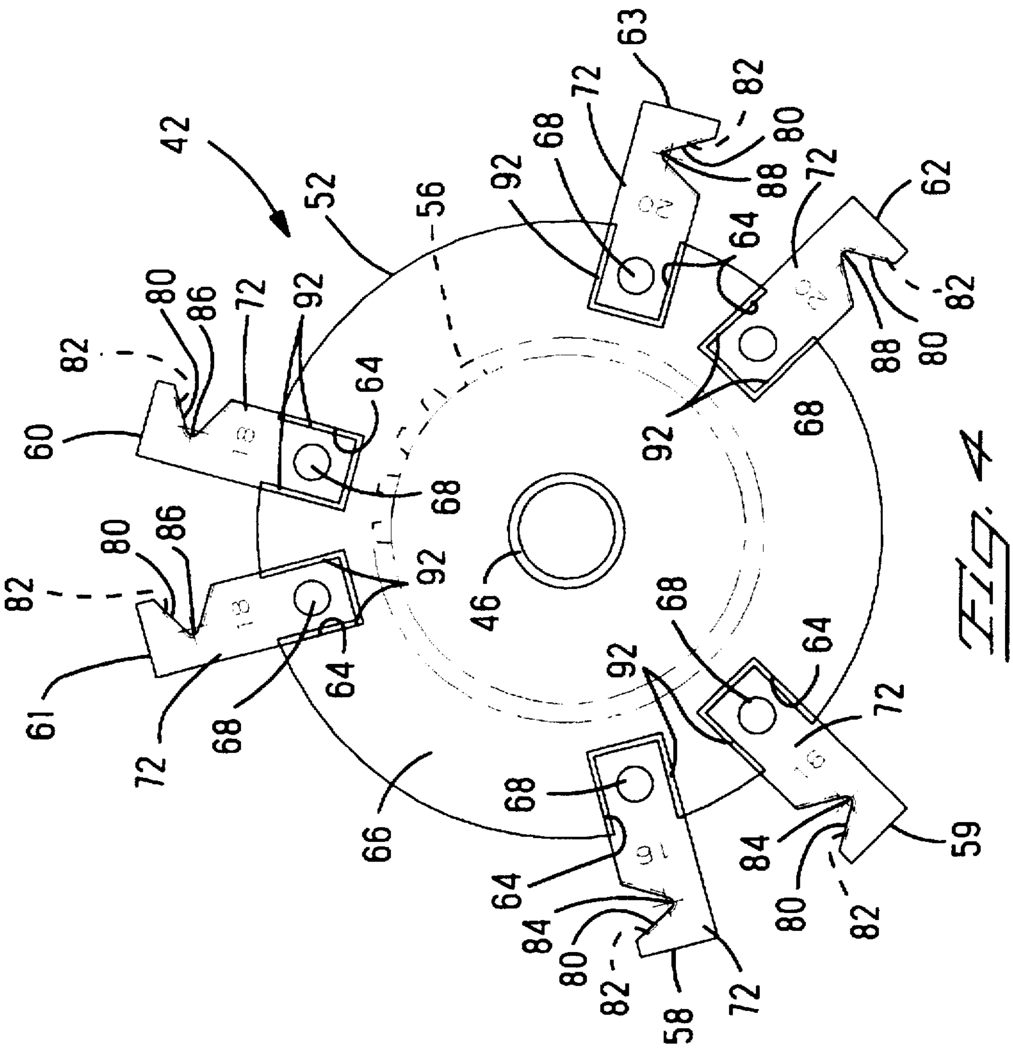
Figure 7:
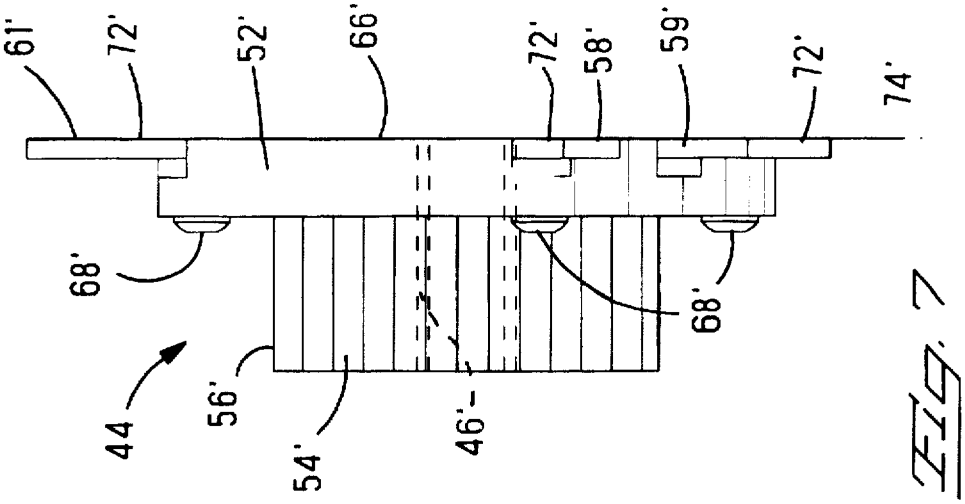
FIGS. 6 and 7 are front and side views, respectively, of the left cutting blade holder shown in FIG. 3.
Figure 6:
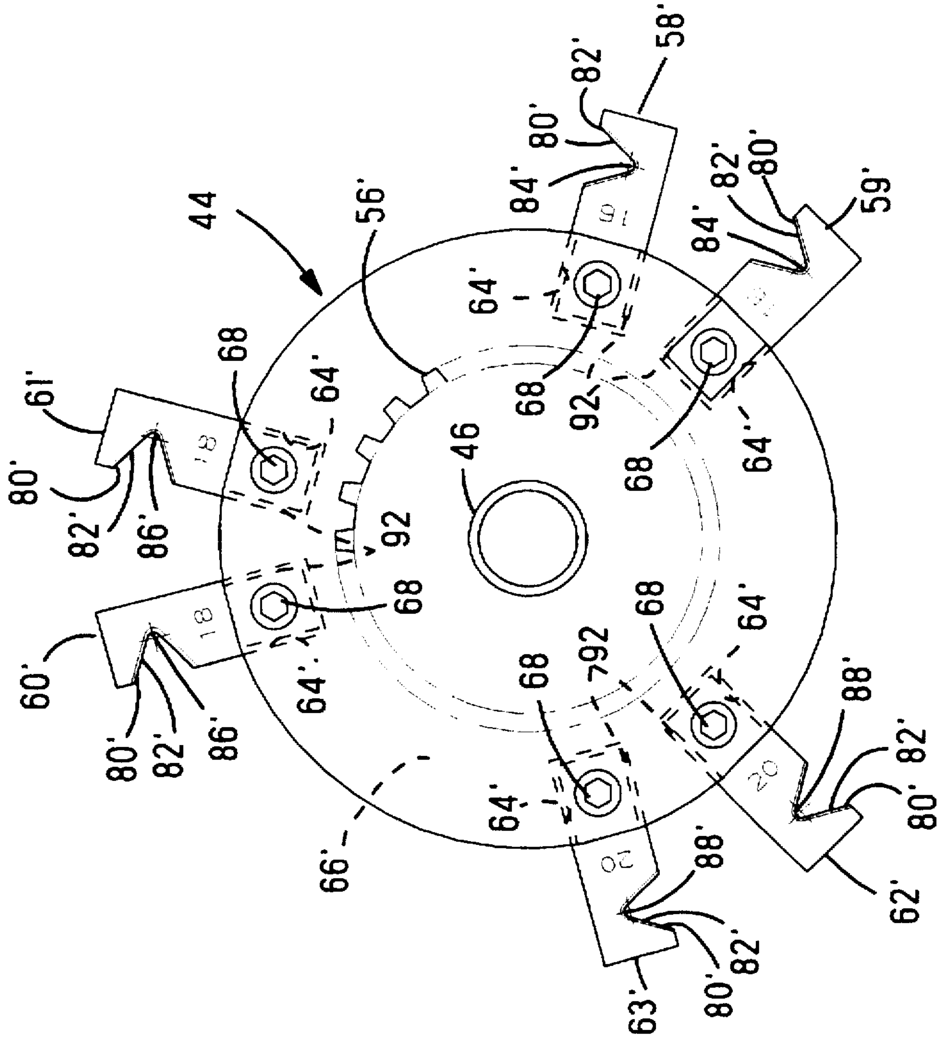

The right and left cutting blade holder assemblies 42 and 44 are shown in FIGS. 4 through 7. These two holder assemblies are substantially similar in structure, therefore, only the right holder assembly 42 will be described in detail. Parts in the left holder assembly 44 will have corresponding identifying numbers to similar parts of the right holder assembly 42, but will be primed. The holder assembly 42 includes a disc-shaped holder 52 and attached hub 54 extending from one side thereof. The hub 54 includes timing belt notches or teeth 56 on its outer periphery for a purpose that will be explained. Three pairs of cutting and stripping blades 58,59; 60,61; and 62,63 are arranged in closely conformal slots 64 that are disposed in a flat face 66 of the disc-shaped holder 52. The three pairs of blades are approximately equally spaced about the periphery of the holder 52. The blades are secured in place by means of screws 68 that extend through clearance holes in the holders 52 and into threaded holes in the cutting and stripping blades, as shown in FIG. 3. Note that each cutting and stripping blade includes a relatively thick shank portion 70 that is disposed within the slot 64 through which the threaded hole extends, as best seen in FIG. 3. Each of the cutting and stripping blades 58, 59, 60, 61, 62, and 63 includes a flat surface 72 that lies in a plane 74 that is perpendicular to the stationary shaft 38. Each of the cutting and stripping blades 58, 59, 60, 61, 62, and 63 has a V-shaped cutting edge 80 having a rake back or relief 82 facing away from the flat surface 72, as best seen in FIGS. 4 and 6. The V-shaped cutting edges 80 of the blades 58 and 59 converge to a vertex radius 84 sized for a 16 gage wire, the cutting edges 80 of the blades 60 and 61 converge to a vertex radius 86 sized for an eighteen gage wire, and the cutting edges 80 of the blades 62 and 63 converge to a vertex radius 88 sized for a twenty gage wire. As will be explained below, the four cutting and stripping blades 58, 59, 58', and 59' will be used in combination to process 16 gage wires, while the other two sets of four blades 60, 61, 60', 61' and 62, 63, 62', 63' will be similarly used to process 18 and 20 gage wires, respectively. The right and left holder assemblies 42 and 44 are arranged on the stationary shaft 38 with a spacer 90 between the housing 32 and each hub 56 and 56'. The spacers 90 have a thickness that minimized end play of the two holder assemblies and maintains the flat surfaces 72 and 72' in close wire shearing engagement, as shown in FIG. 3. In this position the two planes 74 and 74' are very nearly coplanar. It will be appreciated that the flat face 66 of the holder 52 is flush with or slightly receded from the plane 74 to assure that the flat surfaces 72 and 72' remain in close wire shearing engagement. Each blade 58 through 63 and 58' through 63' includes chamfered edges 92 and 92', respectively, as shown in FIGS. 4 and 6, to prevent possible interference as the blades of the right holder assembly 42 begin to engage the blades of the left holder assembly 44.

As shown in FIGS. 2 and 3, the wire cutting and stripping unit 22 includes first and second parallel drive shafts 96 and 98, respectively, journaled for rotation in bearings 100 that are disposed in two opposite side walls of the housing 32. The first drive shaft 96 has a timing belt pulley 102 attached thereto in alignment with the hub 56 of the right holder assembly 42. A timing belt 104 extends about the pulley 102 and into driving engagement with the hub 56 of the holder assembly 42. Similarly, the second drive shaft 98 has a timing belt pulley 106 attached thereto in alignment with the hub 56' of the left holder assembly 44. A timing belt 108 extends about the pulley 106 and into driving engagement with the hub 56' of the left holder assembly 44. Each of the first and second drive shafts 96 and 98 includes a timing belt pulley 110 and 112, respectively, attached to and end thereof, as best seen in FIGS. 2 and 3. A drive motor 14, attached to the frame 16 in any suitable manner, includes a timing belt pulley 116 in alignment with the two pulleys 110 and 112. A double sided timing belt 118 extends about the pulley 116 and in driving engagement with the two pulleys 110 and 112 so that the right and left holder assemblies 42 and 44 rotate in opposite directions.

Figure 8:
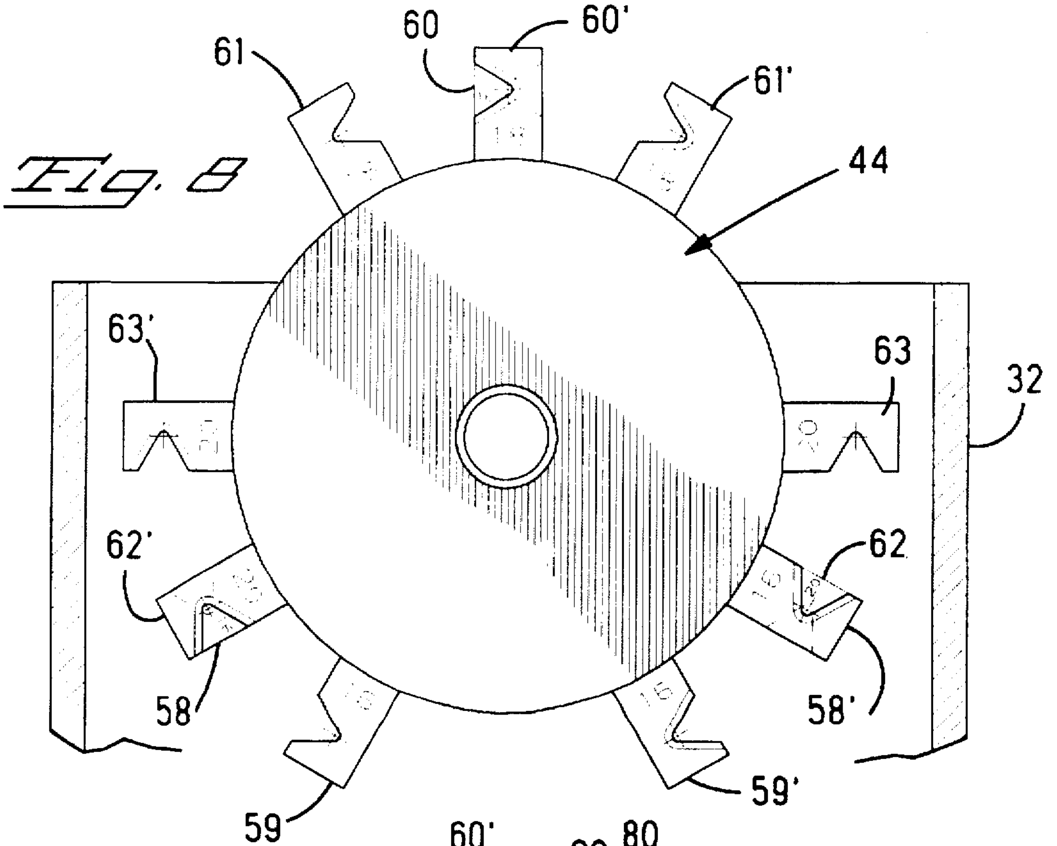
FIGS. 8, 9, and 10 are cross-sectional views similar to a portion of that of FIG. 2 showing the cutting blades in various operating positions.
Figure 9:
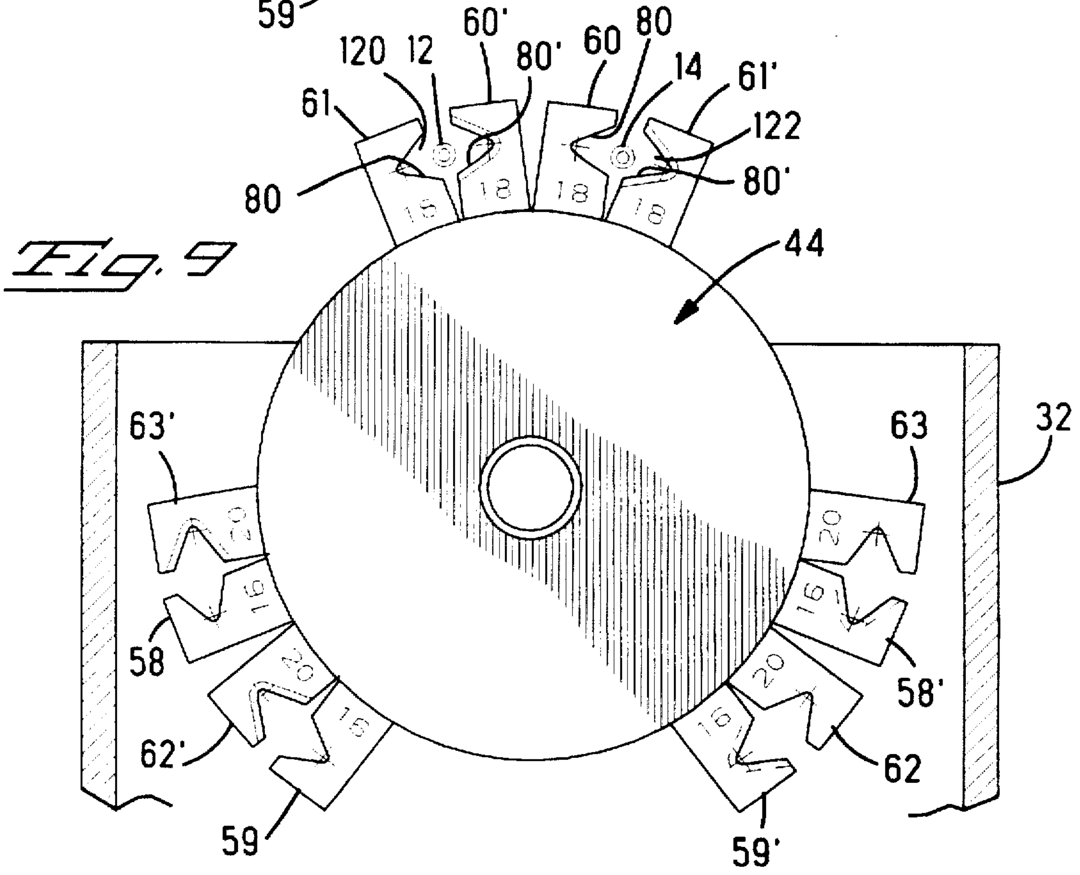
Figure 11:
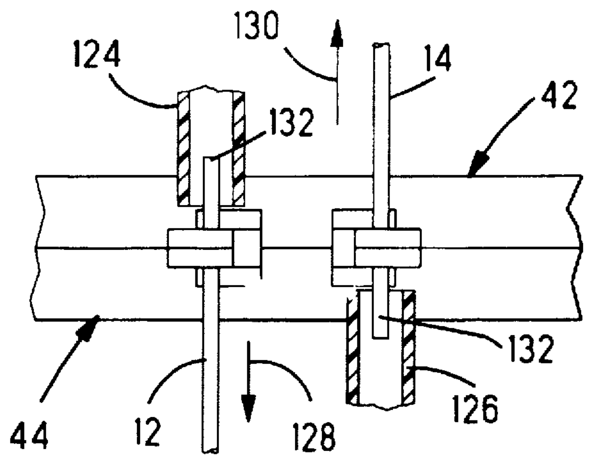
FIG. 11 is a top view of a portion of the cutting blade holders taken from FIG. 10.
Figure 10:
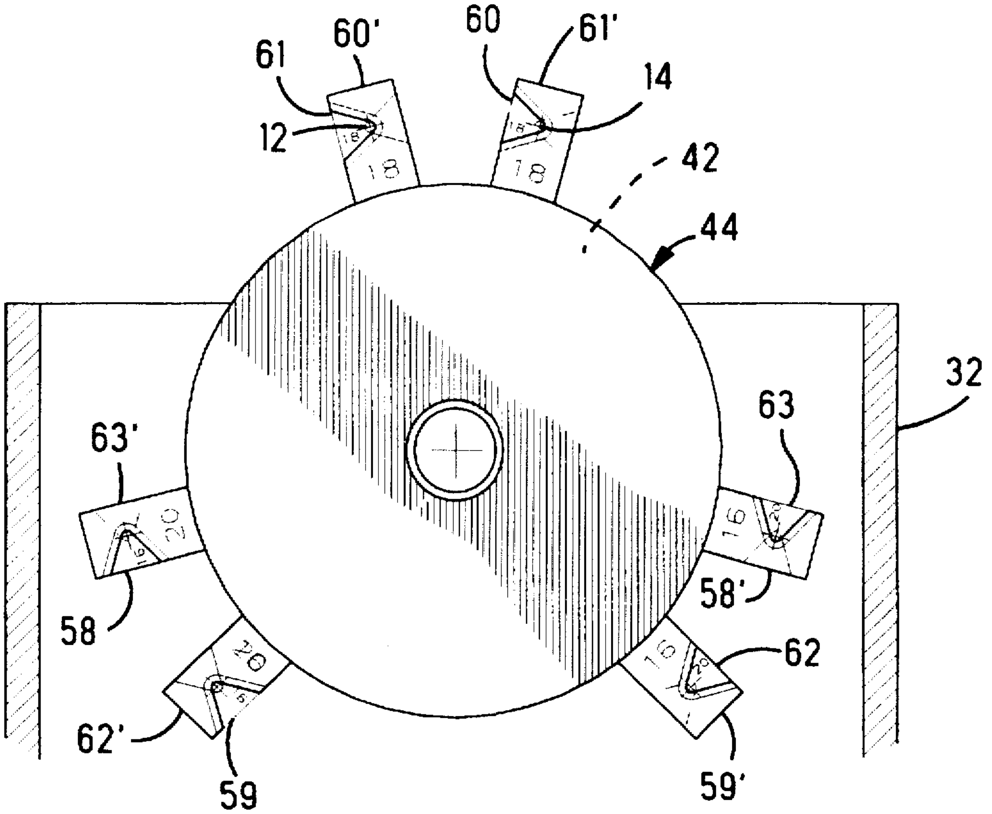

The operation of the machine 10 will now be describe with reference to FIGS. 1, 2, and 8 through 11. It will be assumed that an 18 gage wire 12 has been fed through the wire cutting and stripping unit 22 and is in position to be severed between the two cutting and stripping blades 60 and 60', as shown in FIG. 2. The motor 114 is operated to rotate its pulley 116 counterclockwise, as viewed in FIGS. 2 and 8, thereby rotating the left holder assembly 44 counterclockwise and the right holder assembly 42 clockwise, so that the two cutting and stripping blades 60 and 60' engage and sever the wire 12, as shown in FIG. 8, into a feed end and an eject end, the feed end being the severed end of the wire 12 and the eject end being the severed end of a newly formed wire lead 14. This rotational movement of the right and left holder assemblies 42 and 44 continues until the opposing blades 61 and 60' and the opposing blades 60 and 61' are positioned as shown in FIG. 9, at which time there is a momentary pause in rotation. Concurrently, the feed side wire transfer unit 20 moves the severed end of the wire 12 toward the left to a position in alignment with the space 120 between the two blades 61 and 60', as shown in FIG. 9. Also concurrently, the eject side wire transfer unit 26 moves the severed end of the new lead 14 toward the right to a position in alignment with the space 122 between the two blades 60 and 61', as shown in FIG. 9. The feed side transfer unit 20 then advances the severed end of the wire 12 a short distance past the cutting edges 80 and 80' of the blades 61 and 60', respectively, while the eject side transfer unit 26 similarly advances the severed end of the new lead 14 a short distance past the cutting edges 80 and 80' of the blades 60 and 61', respectively. The ends extend past their respective cutting edges and into scrap collection tubes 124 and 126, respectively, that are associated with the right and left holder assemblies 42 and 44. This short distance that the two ends are moved corresponds to the desired length of insulation that is to be stripped from the ends. The motor 114 is again operated to rotate its pulley 116 counterclockwise, as viewed in FIGS. 9 and 10, thereby rotating the right holder assembly 42 clockwise and the left holder assembly 44 counterclockwise, so that the two cutting and stripping blades 61 and 60' are further moved to engage and sever the insulation of the wire 12, and the two cutting and stripping blades 60 and 61' engage and sever the insulation of the new lead 14, as shown in FIGS. 10 and 11. At this point there is a pause in rotation of the right and left holder assemblies 42 and 44 while the feed side transfer unit 20 retracts the wire 12 and the eject side transfer unit 26 retracts the end of the new lead 14 in the direction of the arrows 128 and 130, respectively, as shown in FIG. 11. This movement of the feed and eject side ends serves to strip the severed slugs 132 of insulation from their ends, whereupon the slugs are picked by a suction in the tubes 124 and 126 and delivered to a scrap collection system for disposal. The motor 114 is then operated in the reverse direction to cause the pulley 116 to rotate clockwise, thereby rotating the right and left holder assemblies 42 and 44 counterclockwise and clockwise, respectively, until they reach the starting positions shown in FIG. 2. The above process is then repeated any desired number of times. When it is desired to process a wire of different gage, for example a 16 gage wire, the right and left holder assemblies 42 and 44 are simply rotated in opposite directions by the motor 114 until the cutting and stripping blades 58 and 59 occupy the positions of the blades 60 and 61 and the blades 58' and 59' occupy the positions of the blades 60' and 61', shown in FIG. 2. The above described operating process is then repeated using the 16 gage cutting and stripping blades 58, 59, 58', and 59'. Similarly, when it is desired to process a 20 gage wire, the 20 gage cutting and stripping blades 62, 63, 62', and 63' are rotated to the present positions of the 18 gage cutting and stripping blades shown in FIG. 2, and the above described operating process repeated.

While the present invention has been describe with reference to a specific structure, variations in this structure may be made which fall within the scope of the teachings of the present invention. Such variations may include means for moving the severed ends of the wire 12 and new lead 14 in the directions of the arrows 128 and 130, respectively, as shown in FIG. 11, other than the feed side and eject side transfer units 2; and 26. Additionally, other means may also be used to move the severed ends laterally into alignment with their respective spaces 120 and 122. Furthermore, assuming that the spaces 120 and 122 are large enough, the timing of the operations of the machine 10 may be controllable to allow the feeding of the ends of the wire 12 and the new lead 14 through their respective spaces 120 and 122 without momentarily stopping the rotation of the left and right holder assemblies 42 and 44. While the above illustrate suitable alternative structures, these structures are by way of example only and it will be understood that other similar alternative structures may be utilized in the practice of the present invention. While the above described wire cutting and stripping unit 22 includes a belt driven mechanism powered by a rotary actuator to move the wire cutting and stripping blades, it will be understood that other actuating mechanisms may be advantageously utilized in the practice of the present invention. Further, while three sets of cutting and stripping blades are described for processing 16, 18, and 20 gage wire sizes, more or fewer such sets of blades may be accommodated on the left and right holder assemblies for processing any desired number of different wire sizes.

An important advantage of the present invention is that the feed end and eject end of the severed wire can be positioned for any desired strip length, wherein the strip length is controllable through automation so that wires having different strip length requirements can be processed by the lead maker in succession without stopping the machine for adjustment. Another important advantage is that the cutting and stripping blade holders can accommodate several different sized sets of blades for cutting and stripping different gage wires which can be automatically positioned for use without stopping the machine. Further, with the present structure, scrap collection tubes can be easily associated with the cutting and stripping blades to efficiently collect the scrap slugs of insulation that are stripped from the wire ends.

I claim:

1. In a machine for processing an insulated wire, to sever said wire into a feed end and an eject end, and to remove a selected portion of insulation from at least one of said feed end and said eject end, the combination comprising:

(1) a wire cutting and stripping unit including a first left blade having a first cutting edge, a second left blade having a second cutting edge, a first right blade having a third cutting edge, and a second right blade having a fourth cutting edge, wherein said first and second left blades are attached to a left holder and said first and second right blades are attached to a right holder;

(2) wire feed unit for moving said wire along a wire path between said first and third cutting edges in a first direction and a second opposite direction;

(3) drive unit for moving said left and right holders in third and fourth opposite directions, respectively, so that said first left and first right blades converge toward each other and said first and third cutting edges effect said severing of said wire, (4) means for further moving said left and right holders in said third and fourth directions, respectively, so that:

said first right and second left blades converge and said second and third cutting edges move into insulation cutting engagement with said elect side end, and said first left and second right blades converge and said first and fourth cutting edges move into insulation cutting engagement with said feed side end.

2. The machine according to claim 1 wherein said moving of said left and right holders in said third and fourth direction is arcuate movement in opposite directions.

3. The machine according to claim 1 wherein said second and fourth cutting edges are arranged so that when they are in said insulating cutting engagement and when said wire feed unit effects said movement of said wire said stripping of said insulation from said feed end and said eject end is effected thereby stripping a slug of insulation from each said feed end and said eject end.

4. The machine according to claim 1 wherein a first space is disposed between said first and second left blades and a second space is disposed between said first and second right blades, said first and second spaces arranged so that after said severing of said wire and before said second and third cutting edges and said first and fourth cutting edges, respectively, come into said insulation severing engagement, said feed end is moveable into said first space a selected distance and said eject end is moveable into said second space a selected distance.

5. The machine according to claim 4 wherein said means for further moving said first and second holders is arranged to move said first and second holders until said third cutting edge is adjacent said first space and spaced from said second cutting edge, then to momentarily stop said further movement until said feed end and said eject end are moved said selected distances.

6. The machine according to claim 1 wherein said first cutting edge and said second cutting edge are in a first plane and said third cutting edge and said fourth cutting edge are in a second plane.

7. The machine according to claim 6 wherein said first and second planes are substantially coplanar.

8. The machine according to claim 3 including a feed end scrap collection member coupled to said machine adjacent said first space and an eject end scrap collection member coupled to said machine adjacent said second space, said feed end and eject end scrap collection members arranged to capture said stripped slugs of insulation.

9. A wire cutting and stripping mechanism for severing a wire having an outer insulating layer and for severing and removing a portion of said outer layer comprising: a frame; first and second left cutting blades on one side of a wire path having first and second cutting edges, respectively, that define a first plane; first and second right cutting blades on an opposite side of said wire path having third and fourth cutting edges, respectively, that define a second plane; a left holder coupled to said frame having said first and second left cutting blades attached thereto; a right holder coupled to said frame having said first and second right cutting blades attached thereto; means arranged to move said left and right holders in first and second discrete amounts of movements separable by a pause in movement, so that during said first amount of movement said first left blade and said first right blade move respectively toward said wire path so that said first and third cutting edges sever said wire into a feed end and an eject end, and during said pause in movement said feed end is moved through said first and second planes a selected distance and said eject end is moved through said first and second planes another selected distance, and during said second amount of movement said second and third cutting edges engage and sever said outer layer of said feed end and said first and fourth cutting edges engage and sever said outer layer of said eject end.

10. The mechanism according to claim 9 including means for moving said feed end and said eject end in opposite directions away from each other along their respective axes after said left and right holders are moved said second amount of movement.

11. The mechanism according to claim 9 wherein said first and second left cutting blades have a first space therebetween and said first and second right blades have a second space therebetween, said first and second spaces arranged so that during said pause in movement of said left and right holders said feed end is moved into said first space said selected distance and said eject end is moved into said second space said another selected distance.

12. The mechanism according to claim 11 wherein said means for moving said left and right holders is arranged to move said blades toward said wire path until said third cutting edge is adjacent said first space and spaced from said second cutting edge, then to momentarily stop said movement until at least one of said feed end and said eject end are moved said selected distance and said another selected distance, respectively.

13. The mechanism according to claim 12 wherein said first and second planes are substantially coplanar.

14. In a method of processing a wire having an insulated outer layer by means of a wire processing machine including a wire cutting and stripping unit including a left holder having first and second left cutting blades attached thereto having first and second cutting edges, respectively, and a right holder having first and second right cutting blades attached thereto having third and fourth cutting edges, respectively, said first and second cutting edges being in a first plane and said third and fourth cutting edges being in a second plane, the method comprising the steps:

(1) moving said wire along said wire path to a desired position between said left and right blades;

(2) moving said left and right holders until said first and third cutting edges sever said wire into a feed end and an eject end;

(3) moving said feed end of said wire between said first and fourth cutting edges through said first and second planes a selected distance;

(4) moving said eject end of said wire between said second and third cutting edges through said first and second planes another selected distance;

(5) further moving said left and right holders until said first and fourth cutting edges and said second and third cutting edges cut said insulated outer layer of both said feed end and said eject end, respectively; then (6) moving said feed end and said eject end axially away from each other, thereby stripping said cut insulated outer layers therefrom.

15. The method according to claim 14 performing steps (3) and (4) only when said first and third cutting edges are adjacent to but spaced from said fourth and second cutting edges, respectively.

16. The method according to claim 15 including momentarily stopping said movement of said first and second blades during the performing of steps (3) and (4).

17. The method according to claim 14 wherein steps (3) and (4) are performed substantially concurrently.

18. The method according to claim 14 wherein said machine includes a feed end scrap collection member coupled to said machine adjacent said first space and an eject end scrap collection member coupled to said machine adjacent said second space, and wherein after step (6):

collecting some of said cut insulated outer layers by means of one of said feed end and eject end scrap collection members.

* * * * *